United States Patent [19]

Fukusaki et al.

[11] 4,100,127
[45] Jul. 11, 1978

[54] PROCESS FOR PREPARATION OF GRAFTED UNSATURATED POLYESTER LIQUID RESIN DISPERSION

[75] Inventors: Hiroshi Fukusaki; Masao Niki; Yukinaga Yokota, all of Wakayama, Japan

[73] Assignee: Kao Soap Co., Ltd., Tokyo, Japan

[21] Appl. No.: 767,150

[22] Filed: Feb. 9, 1977

[30] Foreign Application Priority Data

Mar. 8, 1976 [JP] Japan ................... 51-24870

[51] Int. Cl.$^2$ .............................. C08L 67/06
[52] U.S. Cl. ................... 260/29.6 NR; 260/29.2 UA; 260/29.2 E; 260/22 M; 260/861; 260/867; 260/870; 260/872; 528/110; 528/111; 528/112; 528/297; 528/301; 528/301

[58] Field of Search ............. 260/29.6 RW, 29.6 RB, 260/861, 29.6 NR

[56] References Cited

U.S. PATENT DOCUMENTS

| | | | |
|---|---|---|---|
| 3,398,210 | 8/1968 | Plueddemann et al. | 260/29.6 RB |
| 4,002,700 | 1/1977 | Fukuzoki et al. | 260/872 |
| 4,014,828 | 3/1977 | Thorpe | 260/861 |

*Primary Examiner*—Harold D. Anderson
*Attorney, Agent, or Firm*—Blanchard, Flynn, Thiel, Boutell & Tanis

[57] ABSTRACT

A film-forming liquid resin dispersion is prepared by dispersing a surface active polyester in a collidal form in water or an aqueous solution containing a small amount of a base and grafting a vinyl compound monomer and/or an acrylic or methacrylic acid ester monomer to the surface active polyester.

12 Claims, No Drawings

PROCESS FOR PREPARATION OF GRAFTED UNSATURATED POLYESTER LIQUID RESIN DISPERSION

BACKGROUND OF THE INVENTION

1. Field of the Invention

The present invention relates to a process for the preparation of a film-forming liquid resin dispersion from a thermoplastic polyester.

More particularly, the present invention relates to a process for the preparation of liquid resin dispersions characterized by dispersing a surface active polyester in a collodial form in water or an aqueous solution containing a small amount of a base and grafting a vinyl compound monomer and/or an acrylic or methacrylic acid ester monomer to the surface active polyester.

2. Description of Prior Arts

It is well known in the art that aqueous resin dispersions called "latexes" or "emulsion", which are obtained by emulsions polymerization of monomers such as ethylene, butadiene, styrene, vinyl acetate and acrylic acid esters are valuable as adhesives, coating agents and binders. As another process for the preparation of liquid resin dispersions, there can be mentioned a process comprising bulk- or solution-polymerizing a monomer and dispersing the resulting polymer, directly or after removal of the polymerization solvent, in water by using a water-soluble protective colloid or an emulsifier, if necessary with the aid of a small amount of an organic solvent, by means of a colloid mill or a homogenizer. According to this process, in order to obtain a colloidal dispersion, a large amount of a protective colloid an emulsifier must be used. Such additive tends to have bad influences on the film-forming polymeric material. For example, the additive is poor in the compatibility with the dispersed polymer or inhibits normal formation of a film. Further, the additive degrades the mechanical strength of the film or drastically lowers the water resistance of the film. Moreover, the additive weakens the adhesion between the resin film and the surface of a coated article.

SUMMARY OF THE INVENTION

According to the process of the present invention, a thermoplastic polyester having a surface active property is homogeneously dispersed in water in the colloidal form without using a water-soluble protective colloid or an emulsifier, a vinyl compound and/or an acrylic or methacrylic acid ester monomer is solubilized by the micelles of the polyester dispersion and the monomer is grafted to the polyester in the presence of a radical initiator, whereby a colloidal dispersion having preferred properties as a film-forming material can be obtained.

The process of the present invention comprises the steps of (1) preparing a surface active polyester, (2) dispersing the polyester in the colloidal state into water and (3) modifying the dispersed polyester by grafting thereto a vinyl compound monomer and/or an acrylic or methacrylic acid ester monomer.

The surface active polyester that is used in the present invention is obtained by reacting and condensing a mixed polyol component comprising the following compounds (A) and (B) as indispensable constituents with a dibasic acid component containing an unsaturated dibasic acid to thereby form a polyester having a molecule weight of 500 to 5,000:

(A) At least one ester-forming polyol selected from 4,4'-bis(β-hydroxyethoxyphenyl)-2,2-propane, 4,4'-bis(β-hydroxypropoxyphenyl)-2,2-propane, a diglycidyl ether of bisphenol A, a di-β-methylglycidyl ether of bis-phenol A and 2,2-bis(4-cyclohexanol)-propane.

(B) At least one member selected from polyalkylene glycols represented by the following general formula:

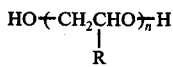

wherein R is —H or —$CH_3$ and $n$ indicates an average degree of polymerization which is in the range of 3 to 100.

As the compound represented by the general formula (B), there can be mentioned, for example, polyethylene glycol, polypropylene glycol and block copolymers thereof.

Surface active characteristics of the polyester which will give good results in the present invention are a property of forming a stable colloidal dispersed material in water, a capacity of solubilizing a hydrophobic organic compound and a property of dispersing organic and inorganic fine powders such as pigments into water. These surface active characteristics are changed depending on such factors as the ratio of the polyester-forming starting compounds and the molecular weight of the polyester. As the ratio of (B) to (A) in the mixed polyol component is lower, the resulting resin is more hydrophobic, and the stability of the colloidal dispersion is reduced. As the ratio of (B) to (A) is higher, the resulting resin is more hydrophilic, and finally, properties of the polyalkylene glycol are predominant. Accordingly, the ratio of (B) to (A) necessary and appropriate for providing a preferred dispersion stability of the resin as a film-forming material and improved mechanical strength and water resistance of a dry film should naturally be limited.

In order to form a desirable colloidal dispersion, it is necessary that the weight ratio of (B) to (A) in the mixed polyol component must be in the range of from 10 to 50%, preferably 15 to 35%. A lower average molecular weight of the polyester gives a colloidal dispersion having a better stability, but the mechanical strength of a dry film is inferior. In the present invention, it is necessary that the number average molecular weight of the polyester must be in the range of from 500 to 5,000, preferably from 1,000 to 3,000.

In case $n$ is in the range of 3 to 10, the colloidal dispersion has very improved emulsion stability and storage stability.

In general, a polyester formed by condensation of multiple components is regarded as a composition including various chemical structures. Also in the above-mentioned polyester colloidal dispersion, it is construed that components having a higher surface active property solubilize hydrophobic components having a low surface active property to give a stable micelle dispersed system.

Unsaturated dibasic acids such as fumaric acid, maleic acid, maleic anhydride and itaconic acid are preferred as the dibasic acid to be condensed with the mixed polyol component of (A) and (B). Of course, these unsaturated dibasic acids may be used in combination with other polybasic acids customarily used for polyester-forming reactions, such as phthalic acid, phthalic anhydride, succinic acid, adipic acid and sebacic acid. In general, as the ratio of the unsaturated dibasic acid to the saturated dibasic acid is lowered, the efficiency of the grafting of a vinyl compound monomer and/or an acrylic or methacrylic acid ester monomer to the resulting polyester is reduced and the film-improving effect is degraded. Accordingly, the dibasic acid component is so adjusted that the unsaturated dibasic acid comprises at least 30 mole % of the total dibasic acid component. Further, these saturated and unsaturated dibasic acids are used in such amounts that the sum of carboxyl groups in these dibasic acids is 0.8 to 1.2 equivalents per equivalent of the sum of hydroxyl and glycidyl groups of the mixed polyol component of (A) and (B). According to need, ethylene glycol, diethylene glycol, linseed oil and castor oil may be added in an amount not exceeding 30% by weight of the sum of the polyester-forming starting compounds.

According to the present invention, the polyester-forming reaction is performed at 180° to 210° C. for several hours under a current of an inert gas such as nitrogen gas or under reduced pressure under agitation, if necessary in the presence of additives customarily used for ester-forming reactions, for example, a defoaming agent such as a silicone oil and an anti-oxidant such as hydroquinone or p-methoxyphenol. The advance of the reaction can be traced and controlled based on such indexes as the acid value, softening point and melt viscosity of the reaction product. In general, the reaction conditions are adjusted so that the acid value of the polyester is 10 to 60, preferably 15 to 40, and the number average molecular weight is 500 to 5,000, preferably 1,000 to 3,000.

The second step of the process of the present invention is one of dispersing the thus-prepared polyester in water in the colloidal state. For this step, there may be adopted a method in which a molten polyester is added to warm water under agitation and a method in which hot water is gradually added to a polyester molten at 100° to 300° C., preferably 100° to 120° C. under agitation. Thereby a water/oil dispersion is first formed and this is then converted to an oil/water dispersion. The latter method gives a finer colloidal dispersion but the dispersion operation of the former method is simpler. In order to facilitate the dispersion operation, a small amount of a base or lower alcohol may be added. In general, it is preferred that a base be added in an amount smaller than 1.2 equivalents per equivalent of the residual acid value of the polyester or a lower alcohol be added in an amount smaller than 20% by weight based on the colloidal dispersed system. The concentration of the polyester in the polyester dispersion may be changed according to the intended object. If the concentration is higher than 50%, the dispersion is readily converted to a pasty system or the viscosity is often increased to too high a level. Accordingly, the concentration is ordinarily adjusted to 10 to 45%. As the base to be added to the dispersion, there can be mentioned, for example, sodium hydroxide, potassium hydroxide, ammonia and amines such as triethyl amine, morpholine, diethanol amine, triethanol amine, isopropanol amine, di-isopropanol amine and tri-isopropanol amine.

At the third step of the process of the present invention, to prevent re-emulsification of a dry film of the dispersion with water and impart preferred film properties such as good toughness and also as a means to introduce chemically active funcational groups into the polyester, a vinyl compound monomer and/or an acrylic or methacrylic acid ester monomer is grafted to the colloidal dispersed surface active polyester. At this step, the surface active characteristics of the polyester are very important. More specifically, a water-insoluble vinyl compound monomer and/or a water-insoluble acrylic or methacrylic acid ester monomer is solubilized by the micelles of the dispersed colloidal polyester and is grafted to the polyester with the aid of a radical initiator to thereby accomplish modification of the polyester. When the resulting dispersion is dried and formed into a film, the micelle structure is destroyed and a homogeneous film is formed. It is construed that at this point, intermolecular forces are caused by the grafted hydrophobic monomer or its oligomer to form a pseudo-crosslinked structure, whereby re-emulsifiability of the film with water is prevented.

The amount of the monomer used in the present invention is limited by the solubilizing power of the polyester dispersion and the dispersion stability of the solubilized monomer. In general, the amount of the monomer is 0.1 to 50% by weight based on the polyester. In some monomers, even if the amount is smaller than 5% by weight, there can be attained satisfactory effects of preventing re-emulsification of a dry film of the polyester dispersion and improving the mechanical strength. In view of the quantitative proportion of the grafted monomer to the polyester, it is construed that the effects by modification are not due to a polymer of the vinyl compound monomer and/or the acrylic or methacrylic acid ester monomer but to the intermolecular forces based on the physical and chemical properties of the monomer. It is construed that active points for the grafting reaction in the molecule chain of the polyester are present at carbon-to- carbon unsaturated bonds, tertiary hydrogens and aliphatic ester linkages where chain transfer is readily caused to occur, and that formation of polymer radicals by reducing groups such as hydroxyethyl and glycol groups participates in the grafting reaction.

The monomer that is used for the grafting reaction in the process of the present invention is at least one member selected from vinyl compound monomers represented by the following general formula (1) and acrylic and methacrylic acid ester monomers represented by the following general formula (2):

wherein X stands for OOCR (in which R″ stands for an alkyl group having 1 to 8 carbon atoms,

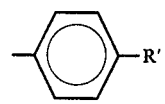

(in which R′ is —H, —CH₃ or —CH=CH₂), —Cl, —CN, —Si(OCH₃)₃, —Si(OC₂H₅)₃, —Si(OCH₂CH₂OCH₃)₃ or Si(OOCCH₃)₃, and

wherein R″ is —H or —CH₃ and Y stands for an alkyl group having 3 to 8 carbon atoms, —(CH₂)₂OR″ (in which R″ stands for an alkyl group having 1 to 4 carbon atoms), a glycidyl group, —(CH$_2$)$_3$Si(OCH$_3$)$_3$ or —(CH$_2$)$_3$Si(OCH$_2$CH$_2$OCH$_3$)$_3$.

As the vinyl compound represented by the general formula (1), there can be mentioned, for example, vinyl acetate, vinyl propionate, vinyl butyrate, vinyl-2-ethyl hexoate, styrene, vinyltoluene, divinylbenzene, vinyl chloride, acrylonitrile, vinyltrimethoxysilane, vinyltriethoxysilane, vinyl-tris(β-methoxyethoxy)-silane.

As the acrylic and methacrylic acid esters represented by the general formula (2), there can be mentioned, for example, propyl acrylate, propyl methacrylate, butyl acrylate, butyl methacrylate, 2-ethylhexyl acrylate, 2-ethylhexyl methacrylate, octyl acrylate, octyl methacrylate, methoxyethyl acrylate, methoxyethyl methacrylate, ethoxyethyl acrylate, ethoxyethyl methacrylate, butoxyethyl acrylate, butoxyethyl methacrylate, glycidyl acrylate, glycidyl methacrylate, γ-acryloxypropyltrimethoxysilane, γ-methacryloxypropyl-trimethoxysilane, γ-acryloxypropyl-tris(β-methoxyethoxy)-silane and γ-methacryloxypropyl-tris(β-methoxyethoxy)-silane.

The reaction of grafting the monomer to the dispersed polyester is carried out in the following manner:

The polyester dispersion is agitated at room temperature or under heating in a current of an inert gas such as nitrogen, and the monomer is added to the dispersion directly or after it has been dissolved in an organic solvent. Then, the mixture is agitated and aged to solubilize the monomer in the colloidal polyester dispersion. As the organic solvent, a lower alcohol, benzene, toluene or the like is used in an amount not exceeding 15% by weight based on the final dispersion. After the monomer is uniformly solubilized, a small amount of a radical initiator is added under agitation, and the reaction is conducted at room temperature or under heating for several hours. As the radical initiator, there may be employed organic peroxides such as benzoyl peroxide and di-t-butyl peroxide and azo compounds such as azobisisobutyronitrile. However, there are preferably employed persulfates such as ammonium persulfate, hydrogen peroxide and redox catalysts formed by combining these inorganic peroxides with reducing agents such as sodium hydrogensulfite and ferrous salts. The reaction is carried out at 50° to 70° C. for 1 to 4 hours. In general, the radical initiator is added in an amount of about 0.1 to about 10% based on the reaction mixture.

The polyester dispersion obtained according to the process of the present invention can be used as a film-forming material for adhesives, paints and inks and as an impregnating agent and a glass fiber binder singly or in combination with a synthetic resin emulsion, a plasticizer, a stabilizer, a defoaming agent, an antistatic agent, a curing agent, a pigment, an extender or the like.

By virtue of high solubilizing power and dispersing power of the colloidal dispersed polyester, incorporation of the foregoing additives can be remarkably facilitated, and various industrial advantages can be attained.

The present invention will now be described in detail by reference to the following Examples and Referential Examples, in which all references to "parts" are by weight.

EXAMPLE 1

A polyester having an acid value of 14.8, a softening point of 55° C. as measured according to the ring and ball method and a number average molecular weight of 2,300 was prepared by reacting 322 parts of 4,4'-bis(β-hydroxyethoxyphenyl)-2,2-propane, 88 parts of polyethylene glycol (having a number average molecular weight of 1,000), 116 parts of fumaric acid, 0.3 part of p-methoxyphenol and 0.1 part of a silicone oil (Toshiba Silicone TSA 730) at 200° C. for about 4 hours in a nitrogen gas current. Then, 400 parts of the thus-prepared polyester in the molten state was added to 1,000 parts of warm water maintained at 70° C. over a period of 30 minutes, and the mixture was agitated for 2 hours to effect aging, whereby a milky white colloidal dispersion having a solid content of about 29% and a viscosity of 100 cps was obtained. Then, 150 parts of this colloidal dispersion was charged in a flask equipped with a stirrer, a nitrogen-inlet, a reflux condenser and a thermometer, and nitrogen gas was introduced into the flask under agitation. Then, 1.5 parts of γ-methacryloxypropyltrimethoxysilane was added and agitation was continued for about 10 minutes, and 1.5 parts of a 10% aqueous solution of ammonium persulfate was added and the temperature was elevated by heating. After the temperature had been elevated to 50° C., 2.25 parts of a 10% aqueous solution of sodium hydrogensulfite was added and agitation was continued for 1 hour at 50 to 55° C. to effect reaction. As a result, there was obtained a stable colloidal dispersion having a non-volatile content of about 30% and a viscosity of 170 cps. A dry film having a thickness of about 0.5 mm was formed on a release paper by using this dispersion, and the mechanical strength of the film was examined by a Tensilon tensile tester. The maximum tensile strength was 26 Kg/cm$^2$ and the elongation at break was 280%. When this film was dipped in water for 24 hours, it was not re-emulsified.

EXAMPLE 2

A polyester having an acid value of 20, a softening point of 78° C. and a number average molecular weight of 2,000 was prepared by reacting 280 parts of 4,4'-bis(β-hydroxypropoxyphenyl)-2,2-propane, 189 parts of 2,2-bis(4-cyclohexanol)-propane, 186 parts of maleic acid, 131 parts of polyethylene glycol (having a number average molecular weight of 1,000), 0.4 part of p-methoxyphenol and 0.16 part of a silicone oil (Toshiba Silicone TSA 730) at 200° C. for about 6 hours in the same manner as described in Example 1. Then, 100 parts of the thus-prepared resin was heated and melten at 110° C. and 243 parts of water containing 3 parts of morpholine and maintained at about 90° C. was gradually added to the polyester under agitation. The mixture passed through a water/oil type dispersion and was finally formed into a homogeneous semi-transparent oil/water type colloidal dispersion having a non-volatile content of about 20% and a viscosity of 2,000 cps.

In the same reaction vessel as used in Example 1, 6 parts of an ethanol solution containing 1 part of styrene and 1.5 parts of a 10% aqueous solution of ammonium persulfate were added to 100 parts of the so formed dispersion, and the reaction was carried out at 70° C. for 4 hours. A dry film formed from the thus-prepared colloidal dispersion had a maximum tensile strength of 45 Kg/cm$^2$ and an elongation at break of 150%.

EXAMPLE 3

A small amount of p-methoxyphenol was added to a mixture of 206 parts of di-β-methylglycidyl ether of bisphenol A, 34 parts of 2,2-bis(4-cyclohexanol)-propane, 81 parts of maleic acid and 85 parts of polypropylene glycol (having a number average molecular weight of 1,500), and the reaction was carried out at 180° to 200° C. for 4 hours to obtain a polyester having an acid value of 67, a softening point of 71° C. and a number average molecular weight of 1,400. Then, 130 parts of the thus-prepared resin was dispersed in 394 parts of an aqueous solution containing 27 parts of triisopropanol amine and aged at 80° C. to obtain a colloidal dispersion having a non-volatile content of 30% and a viscosity of 250 cps. In the same manner as described in Example 1, 100 parts of this dispersion was reacted with 1 part of 2-ethoxyethyl methacrylate and 1 part of γ-methacryloxypropyltrimethoxysilane in 5 parts of isopropyl alcohol by using a redox catalyst comprising 1 part of a 10% aqueous solution of potassium persulfate and 1.5 parts of a 10% aqueous solution of sodium hydrogensulfite at 55° C. for 2 hours. A dry film prepared from the resulting colloidal dispersion had a maximum tensile strength of 15.6 Kg/cm$^2$ and an elongation at break of 325%.

EXAMPLE 4

Small amounts of hydroquinone and a silicone oil (Toshiba Silicone TSA 730) were added to a mixture of 271 parts of 4,4'-bis(β-hydroxypropoxyphenyl)-2,2-propane, 53 parts of 2,2-bis (4-cyclohexanol)-propane, 116 parts of fumaric acid and 110 parts of polyethylene glycol (having a number average molecular weight of 1,500), and the reaction was carried out at 200 to 210° C. to obtain a polyester having and acid value of 16.5, a softening point of 63° C. and a number average molecular weight of 2,300. Then, 100 parts of the thus-prepared polyester was dispersed under heating and agitation into 235 parts of water containing 5 parts of di-isopropanol amine and maintained at 70° C. and the mixture was aged to obtain a colloidal dispersion having a non-volatile content of about 30% and a viscosity of 420 cps. In the same manner as described in Example 1, 100 parts of the thus-prepared dispersion was subjected to the grafting reaction by using the following components:

| | |
|---|---|
| Polyester dispersion | 100 parts |
| Monomer (shown in Table 1) | 2 to 25 parts |
| Ethanol | 10 parts |
| 10 % Ammonium persulfate | 1.0 part |
| 10 % Sodium hydrogensulfite | 1.5 parts |

Each of the resulting colloidal dispersions was a transparent or translucent liquid having a viscosity lower than 1,000 cps, and each dry film was not re-emulsified in water at all. Mechanical properties of dry films prepared from the resulting colloidal dispersions are shown in Table 1.

Table 1

| Run No. | Monomer (parts) | Mechanical Strength of Dry Film | |
|---|---|---|---|
| | | maximum tensile strength (Kg/cm$^2$) | elongation (%) at break |
| 1 | glycidyl methacrylate (4) | 14.2 | 400 |
| 2 | butyl acrylate (3.7) | 19.0 | 240 |
| 3 | 2-ethylhexyl acrylate (25) | 27.0 | 190 |
| 4 | vinyltriethoxysilane (2) | 10.0 | 550 |
| 5 | butyl acrylate (1.2) + γ-methacryloxypropyl-trimethoxysilane | 49.0 | 250 |

EXAMPLE 5

A mixture of 420 parts of 4,4'-bis(β-hydroxypropoxyphenyl)-2,2-propane, 72 parts of 2,2-bis(4-cyclohexanol)-propane, 133 parts of polyethylene glycol (having a number average molecular weight of 1,000), 40 parts of linseed oil, 174 parts of fumaric acid and a small amount of p-methoxyphenol was reacted at 200° C. for about 7 hours to obtain a polyester having an acid value of 22, a softening point of 52° C. and a number average molecular weight of 1,830. Then, 100 parts of this polyester was dispersed in 230 parts of water containing 3.4 parts of morpholine and maintained at 70° C. and aged to form a colloidal dispersion having a non-volatile content of about 30% and a viscosity of 250 cps. Then, 0.6 part of styrene and 1.0 part or γ-methacryloxypropyltrimethoxysilane were dissolved in 100 parts of the thus-prepared dispersion. The graft reaction was carried out at 50° C. in a nitrogen gas current by using the same redox catalyst in the same amount as in Example 1 to obtain a translucent colloidal dispersion having a viscosity of 500 cps. Then, 220 parts of this colloidal dispersion was mixed and ground with 45 parts of powdery titanium oxide (R-820) for 16 hours in a ball mill to obtain a colored enamel in which the pigment/resin ratio was 40/60 and the non-volatile content was about 45%. According to the ordinary paint test method described in JIS K-5400, the enamel was coated on a tinplate by a brush and dried at room temperature for 24 hours. The coating of the dried specimen had excellent gloss and pigment dispersibility. When the specimen was dipped in water for 96 hours, no change was observed in the coating.

EXAMPLE 6

A mixture of 470 parts of 4,4'-bis(β-hydroxyproxyphenyl)-2,2-propane, 175 parts of polyethylene glycol (having a number average molecular weight of 200), 70 parts of maleic acid, 140 parts of succinic acid, 0.4 part of p-methoxyphenol and 0.1 part of a silicone oil (Toshiba Silicone TSA 730) was reacted at 200° C. for about 5 hours to obtain a polyester having an acid value of 23, a softening point of 35° C. and a number average molecular weight of 1,450. Then, 100 parts of the thus-prepared resin was dispersed at 50° C. under agitation into 200 parts of 2.5% aqueous ammonia to form a semi-transparent colloidal dispersion having a non-volatile component of about 33% and a viscosity of about 70 cps. In the same reaction vessel as used in Example 1, 20 parts of butyl methacrylate and 15 parts of water were incorporated and dissolved in 100 parts of the thus-formed dispersion under agitation. Then, 1.5 parts of a 10% aqueous solution of ammonium persulfate was added to the dispersion and the grafting reaction was carried out at 55° C. for 2 hours. The resulting colloidal dispersion was very stable even when it was stored for a long time. A dry film prepared from this colloidal dispersion was excellent in the water resistance, blocking resistance and gloss, and the colloidal dispersion was found to be an excellent varnish.

EXAMPLE 7

A mixture of 250 parts of 4,4'-bis(β-hydroxypropoxyphenyl)-2,2-propane, 140 parts of polyethylene glycol (having a number average molecular weight of 400), 157 parts of fumaric acid, 0.3 part of p-methoxyphenol and 0.1 part of a silicone oil (Toshiba Silicone TSA 730) was reacted at 200° C. for about 7 hours to obtain a polyester having an acid value of 22, a softening point of 55° C. and a number average molecular weight of 2,000. Then, 120 parts of the thus-prepared resin was dispersed at 70° C. under agitation into 204 parts of water containing 9.5 parts of triisopropanol amine to form a translucent colloidal dispersion having a non-volatile component of about 40% and a viscosity of about 1050 cps. In the same reaction vessel as used in Example 1, 2.5 parts of 2-methoxyethyl methacrylate was incorporated and dissolved in 100 parts of the thus-formed dispersion under agitation. Then, 1.5 parts of a 11% aqueous solution of ascorbic acid was added and the dispersion was heated at 50° C. Then, 2.0 parts of 2% aqueous hydrogen peroxide and 0.5 part of a 0.5% aqueous solution of ferrous sulfate were added and the reaction was carried out for 2 hours. A dry film prepared from the resulting dispersion had a maximum tensile strength of 5 Kg/cm² and an elongation at break of about 100% and was very soft. When the dispersion was used as an adhesive, it showed an excellent adhesive property to a variety of materials such as papers, cloths, wooden materials, plastic films and the like.

The embodiments of the invention in which an exclusive or privilege property is claimed are defined as follows:

1. A process for preparing a liquid resin dispersion, which comprises the steps of:
(1) preparing a surface active, unsaturated polyester by reacting and condensing a polyester-forming dicarboxylic acid component containing at least 30 mole % of an unsaturated dicarboxylic acid or anhydride thereof, with a mixture of polyol components consisting essentially of
(A) at least one ester-forming polyol selected from the group consisting of 4,4'-bis(β-hydroxyethoxyphenyl)-2,2-propane, 4,4'-bis(β-hydroxypropoxyphenyl)-2,2-propane, diglycidyl ether of 2,2-bis(4-hydroxyphenyl)propane, di-β-methylglycidyl ether of 2,2-bis(4-hydroxyphenyl)propane and 2,2-bis(4-hydroxycyclohexyl)propane, and
(B) at least one member having the formula

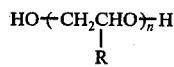

wherein R is H or CH₃ and n is from 3 to 100, wherein the amount of (B) is from 10 to 50% by weight, based on the weight of A,
whereby to form a surface active, unsaturated polyester having a number average molecular weight of from 500 to 5000;
(2) dispersing the unsaturated polyester obtained in step (1) in the colloidal state in water to form an oil-in-water colloidal dispersion, said dispersion being free of water-soluble protective colloids and emulsifiers,
(3) adding to the dispersion obtained in step (2) from 0.1 to 50% by weight, based on the weight of said polyester, of at least one water-insoluble monomer selected from the group consisting of (a) monomers having the formula

CH₂=CHX wherein X is —OOCR″ wherein R″ is alkyl having one to 8 carbon atoms,

wherein R' is H, CH₃ or CH=CH₂, —Cl, —CN, —Si(OCH₃)₃, —Si(OC₂H₅)₃, —Si(OCH₂CH₂OCH₃)₃ or —Si(OOCCH₃)₃, and (b) monomers having the formula

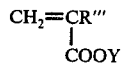

wherein R‴ is —H or —CH₃, and Y is alkyl having 3 to 8 carbon atoms, —(CH₂)₂OR″″ wherein R″″ is alkyl having one to 4 carbon atoms, glycidyl, —(CH₂)₃Si(OCH₃)₃ or —(CH₂)₃Si(OCH₂CH₂OCH₃)₃,
so that said monomer is solubilized by said polyester, and adding a radical polymerization initiator and grafting said monomer to said polyester whereby to obtain an aqueous dispersion of said polyester having said monomer grafted thereto.

2. A process according to claim 1 wherein the weight ratio of (B) to (A) is in the range of from 15 to 35%.

3. A process according to claim 1 wherein the total amount of carboxyl groups in the dicarboxylic acid component is 0.8 to 1.2 equivalents per equivalent of the sum of hydroxyl and glycidyl groups in the components (A) and (B).

4. A process according to claim 1 wherein the unsaturated dicarboxylic acid is fumaric acid or maleic acid.

5. A process according to claim 1 wherein the surface active polyester has a number average molecular weight of 1,000 to 3,000.

6. A process according to claim 1 wherein in the oil-in-water colloidal dispersion of the surface active polyester, the concentration of the polyester is 10 to 45% by weight, based on the weight of said dispersion.

7. A process as claimed in claim 1, in which n is in the range of 3 to 10.

8. A process according to claim 1 in which the acid value of said polyester is from 10 to 60.

9. A process according to claim 5 in which the acid value of said polyester is from 15 to 40.

10. A process according to claim 8 in which in step (2), there is added to the dispersion a base in an amount of smaller than 1.2 equivalents per equivalent of the acid value of the polyester.

11. A process according to claim 8 in which in step (2) there is added to the dispersion less than 20% by weight of a lower alcohol, based on the weight of the colloidal dispersion.

12. A process for preparing a liquid resin dispersion, which comprises the steps of
(1) preparing a surface active, unsaturated polyester by reacting and condensing at from 180° to 210° C, a polyester-forming dicarboxylic acid component containing at least 30 mole % of an unsaturated dicarboxylic acid or anhydride thereof selected from the group consisting of fumaric acid, maleic acid, maleic anhydride and itaconic acid, with a mixture of polyol components consisting essentially of
(A) at least one ester-forming polyol selected from the group consisting of 4,4'-bis(β-hydroxyethoxyphenyl)-2,2-propane, 4,4'-bis(β-hydroxypropoxyphenyl)-2,2-propane, diglycidyl ether of 2,2-bis(4-hydroxyphenyl)propane, di-β-methylglycidyl ether of 2,2-bis(4-hydroxyphenyl)propane and 2,2-bis(4-hydroxycyclohexyl)-propane, and (B) at least one member having the formula

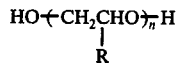

wherein R is H or $CH_3$ and $n$ is from 3 to 10 wherein the amount of (B) is from 15 to 35% by weight, based on the weight of (A), wherein the amount of said dicarboxylic acid component is from 0.8 to 1.2 equivalents per equivalent of the sum of the hydroxyl and glycidyl groups of said polyol mixture, whereby to form a surface active unsaturated polyester having a number average molecular weight of from 1000 to 3000 and an acid value of from 15 to 40;

(2) melting the unsaturated polyester obtained in step (1) and mixing said molten unsaturated polyester with hot water to form an oil-in-water colloidal dispersion containing from 10 to 45% by weight of said polyester in the oil phase, said dispersion being free of water-soluble protective colloids and emulsifiers, (3) adding to the dispersion obtained in step (2) at least one water-insoluble monomer selected from the group consisting of vinyl acetate, vinyl propionate, vinyl butyrate, vinyl-2-ethyl hexoate, styrene, vinyl toluene, divinyl benzene, vinyl chloride, acrylonitrile, vinyltrimethoxysilane, vinyltriethoxysilane, vinyl-tris(β-methoxyethoxy)-silane, propyl acrylate, propyl methacrylate, butyl acrylate, butyl methacrylate, 2-ethylhexyl acrylate, 2-ethylhexyl methacrylate, octyl acrylate, octyl methacrylate, methoxyethyl acrylate, methoxyethyl methacrylate, ethoxyethyl acrylate, ethoxyethyl methacrylate, butoxyethyl acrylate, butoxyethyl methacrylate, glycidyl acrylate, glycidyl methacrylate, γ-acryloxypropyl-trimethoxysilane, γ-methacryloxypropyl-trimethoxysilane, γ-acryloxypropyl-tris(β-methoxyethoxy)-silane and γ-methacryloxypropyl-tris(β-methoxyethoxy)-silane, wherein the amount of said monomer is from 0.1 to 50% by weight, based on the weight of said polyester, so that said monomer is solubilized by said polyester, and adding a radical polymerization initiator and then reacting same at 50° to 70° C for about 1 to 4 hours whereby to obtain an aqueous dispersion of said polyester having said monomer grafted thereto and useful as a film-forming material which film, after drying, cannot be re-emulsified by contact with water.

* * * * *